United States Patent [19]

Ward et al.

[11] 4,404,503
[45] Sep. 13, 1983

[54] RECIPROCATING ELECTRIC MOTOR

[76] Inventors: William L. Ward, 2618 Amherst Dr., Wichita Falls, Tex. 76308; Robert N. Ward, 1717 Midwestern Pkwy., #134, Wichita Falls, Tex. 76302

[21] Appl. No.: 317,153

[22] Filed: Nov. 2, 1981

[51] Int. Cl.³ .............................................. H02K 7/06
[52] U.S. Cl. .................................... 318/119; 310/37; 310/12
[58] Field of Search .................................. 310/12-13, 310/15, 17, 20-21, 23, 24, 34, 35; 318/119, 121-123, 125-127, 129-132, 37-38, 680-687

[56] References Cited

U.S. PATENT DOCUMENTS

| | | | |
|---|---|---|---|
| 473,929 | 5/1892 | Hosford | 318/121 |
| 538,351 | 4/1895 | Sabin . | |
| 1,349,100 | 8/1920 | Reynolds . | |
| 1,436,245 | 11/1922 | Geisler . | |
| 1,886,040 | 11/1932 | Moodyman . | |
| 1,912,441 | 6/1933 | Foust . | |
| 2,338,005 | 12/1943 | Morch . | |
| 3,676,719 | 7/1972 | Pecci . | |
| 3,832,608 | 8/1974 | Mills . | |
| 3,932,792 | 1/1976 | Massie | 318/119 |
| 4,012,675 | 3/1977 | Schulze, Jr. . | |
| 4,019,103 | 4/1977 | Davis et al. . | |
| 4,128,020 | 12/1978 | Gray . | |
| 4,187,440 | 2/1980 | Ulmer . | |
| 4,228,373 | 10/1980 | Funderburg | 310/20 |

Primary Examiner—J. V. Truhe
Assistant Examiner—A. Evans
Attorney, Agent, or Firm—Henderson & Sturm

[57] ABSTRACT

An electromagnetic motor with a piston coil supported on a shaft between the field coils, the shaft being slideably supported in the frame so that the piston coil is moveable between the field coils. The piston coil is in electrical connection with the power source and has a constant magnetic polarity. The field coils and piston coil all are wound in the same direction. The shaft supporting the piston coil is pivotally connected to a crankshaft. The magnetic distributor switches are activated by rotation of the rotor in response to movement of the piston to maintain the field coils at opposite polarities and to reverse the polarities of the field coils at the end of each stroke of the piston, the piston having a two stroke cycle. The field coils also include secondary coils to recover energy from the primary coils by induction. A pulser is provided electrically intermediate the power source and the field coils to supply pulsed current to the field coils. A cam is secured to the crankshaft to reciprocally drive compression pistons in the compression cylinders of a hydraulic system. The compression pistons have a compression stroke and an intake stroke. The hydraulic fluid of the hydraulic system being compressed by the compression pistons during the compression stroke to maintain steady pressure in the hydraulic system and also to dampen vibrations of the electric motor of the present invention.

18 Claims, 14 Drawing Figures

RECIPROCATING ELECTRIC MOTOR

BACKGROUND OF THE INVENTION

The present invention relates to electric motors, and more particularily to electromagnetic motors having a piston coil which moves reciprocally with respect to one or more field coils.

Examples of such electromagnetic motors are disclosed in U.S. Pat. Nos. 4,019,103; 3,832,608; 538,351; 4,187,440; 2,338,005; 1,349,100; 4,012,675; 4,128,020; 1,912,441; 1,436,245; 1,886,040; and 3,676,719.

The majority of the above patents disclose nonenergized, permanent magnet pistons and structures having only one field coil for each piston member. As a result, the power output and efficiency of the prior art devices has been very limited. The prior art devices also entailed a great waste of energy as the energy required to reverse or change the magnetic field of the field coils was not recovered. In addition, the prior art structures were inherently high vibration machines due to the nature of magnetic repulsion and attraction forces.

SUMMARY OF THE INVENTION

The present invention overcomes the various shortcomings of the prior art by providing a highly efficient motor having a reciprocating piston coil which is simultaneously attracted by one field coil and repelled by the other. The invention includes a novel distributor structure which reverses the polarity of the field coils at the end, or near the end, of each stroke of the two stroke piston cycle, to produce a high powered reciprocating movement in the piston coil.

Secondary coils are provided adjacent primary coils of the field coils to recover a portion of the energy of the collapsing magnetic field of the primary coils as their polarities are reversed. A pulser is provided to supply the primary coils with a high frequency pulsed current to pulse the magnetic fields of the primaries to enhance energy recovery by the secondaries.

The reciprocating piston of the present invention is supported by a drive shaft which rotatably drives a cam through a crankshaft. The rotation of the cam produces reciprocating action in the compression pistons of a hydraulic system which both maintains operating pressure in the hydraulic system and serves to dampen machine vibrations.

It is, therefore, an object of the present invention to produce an improved electromagnetic motor.

It is a further object to provide an electromagnetic motor which utilizes simultaneous attraction and repulsion forces from field coils to drive a piston coil.

It is a further object to provide a highly novel distributor structure which reverses the polarity of the field coils at, or near, the end of each stroke of the piston coil's two stroke cycles.

It is a still further object to provide energy recovery coils adjacent the primary coils of the field coils to improve the efficiency of the present invention.

Still another object is the provision of an energy recovery system in an electromagnetic motor which increases energy recovery through the use of a pulser which supplies high frequency current pulses to the field coils.

Yet another object is the provision of an electromagnetic motor which can be used to maintain pressure in a hydraulic system by reciprocally driving compression pistons of the system, the driving of the compression pistons of the hydraulic system being used as well to dampen motor vibrations.

These and other objects advantages and novel features of the present invention will become apparent from the following detailed description of the invention taken in conjunction with the accompanying drawings.

DESCRIPTION OF THE PREFERRED EMBODIMENT

Figure 1:
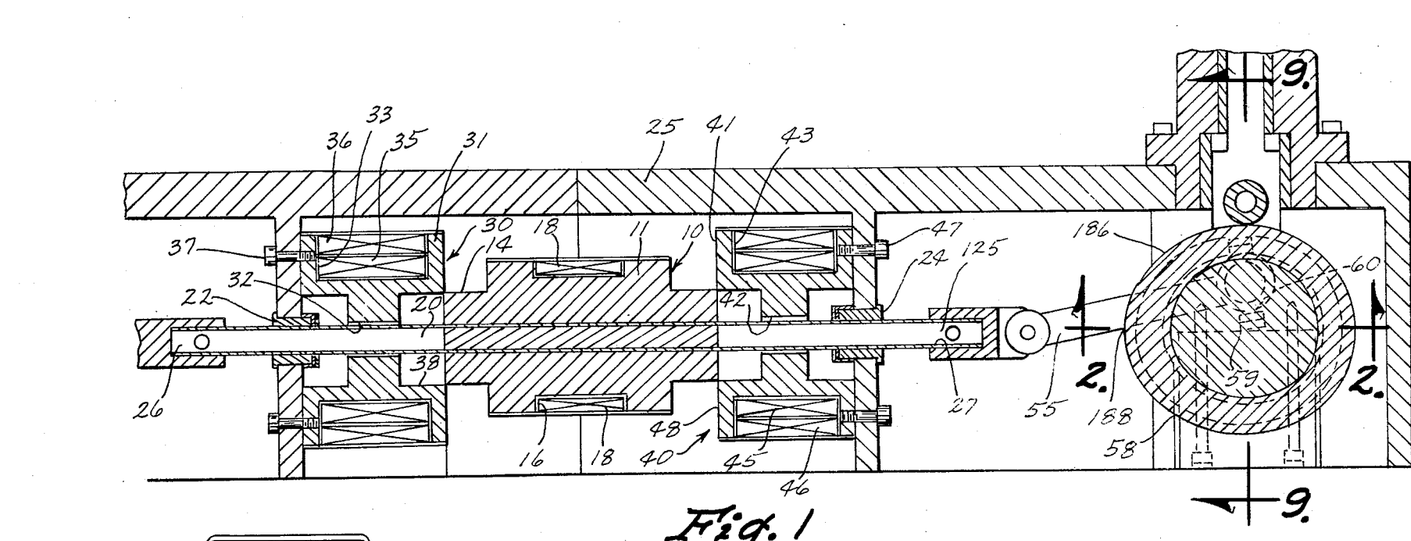
FIG. 1 is a cross-sectional plan view of the electromagnetic motor of the present invention.

With reference to FIG. 1, the motor 1 of the present invention is comprised generally of permanent magnet piston coil 10 which is adapted to reciprocate linearly between a first field coil 30 and a second field coil 40, due to the magnetic attraction and repulsion between the coils 10, 30 and 40 as will become apparent. A drive shaft 20 is rigidly secured to the piston coil 10 to transfer the reciprocating motion of the piston coil 10 to rotary motion to perform work.

Piston coil 10 and the field coils 30 and 40 are housed within a suitable frame 25.

Piston coil 10 is comprised of a permanent magnet 11 encircled by an electrically conductive coil 18. The coil 18, when energized, enhances the magnetism of the permanent magnet 11 as is well known. Permanent magnet 11 is substantially cylindrical having a central cylindrical body portion 13 and smaller cylindrical end portions 14 and 15, projecting therefrom. An annular recess 16 is formed into the body portion 13, to accommodate the electrically conductive coil 18 which is wound thereabout. The drive shaft 20 is rigidly secured through the center of piston coil 10 by any suitable means. The shaft 20 is journaled at its opposing ends within bearings 22 and 24 which are secured to frame 25 as shown. The bearings 22, 24 and shaft 20 allow the piston coil 10 to reciprocate linearly between the field coils 30 and 40.

Field coils 30 and 40 are identical. Each coil 30, 40 is comprised of a spool 31, 41, having a hollow interior 32, 42 which slideably receives the shaft 20. Each spool 31, 41 has an annular recess 33, 43 which suitably accommodates a primary coil 35, 45 and a secondary coil 36, 46 as shown. The field coils 30 and 40 are rigidly secured to the frame 25 by means of suitable fasteners 37, 47. Each spool 30, 40 has a cylindrical cavity 38, 48 to accommodate the cylindrical ends 14, 15, respectively of the piston coil 10. The piston 10 reciprocates between the field coils 30 and 40 due to the energization of the coils 18, 35 and 45 and resulting electromagnetism in a manner later described.

Note that frame 25 and other materials surrounding the magnets 10, 30 and 40 are constructed from non-magnetic materials such as aluminum or plastic to prevent distortion in the magnetic flux.

Drive shaft 125 has a connecting rod 55 pivotally connected to each end 26, 27 thereof in a well known manner. To simplify the description, the rotary drive structure at only one end of the shaft 20 will be described, however, it is to be understood that an identical structure is found at the other end of shaft 20. Connecting rod 55 is pivotally secured to a split cam 58 which in turn is rigidly secured to a crankshaft 60. Crankshaft 60 is rotatably driven by the drive shaft 20, connecting rod 55, and cam 58 linkage in an easily appreciated manner. Crankshaft 60 is rotatably journaled in the frame 25 by means of a suitable bearing 62 (FIG. 2).

Figure 2:
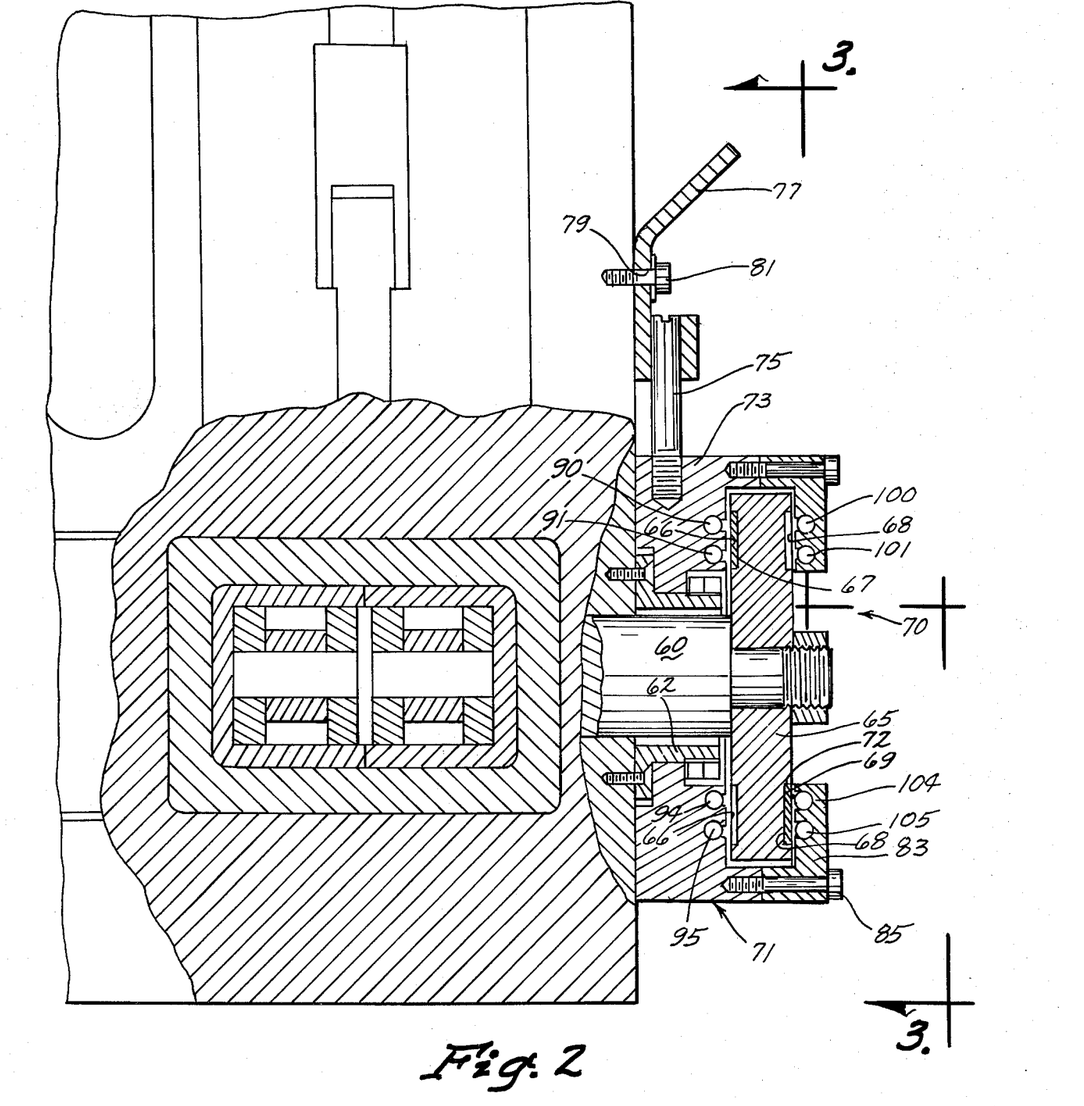
FIG. 2 is a cross-sectional elevation view taken along line 2—2 of FIG. 1 showing the distributor of the present invention.
Figure 3:
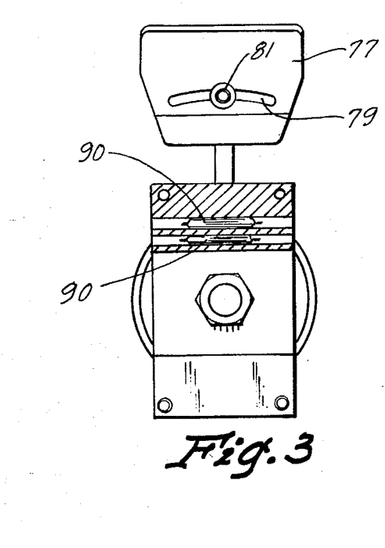
FIG. 3 is an elevational view in partial cross-section taken along line 3—3 of FIG. 2 showing the distributor of the present invention.
Figure 4:
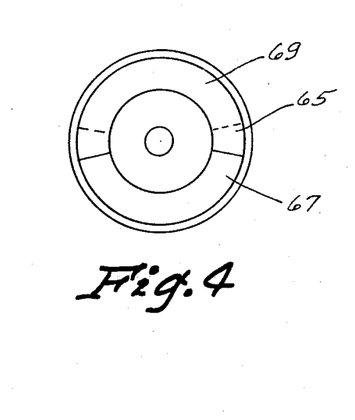
FIG. 4 is an elevational view showing the rotor of the present invention.

In addition to this rotary drive structure 55, 58 and 60 which is found at both ends 26 and 27, end 27 in addition includes a distributor assembly 70 (FIGS. 2-4). Distributor 70 includes a rotor 65 which is rigidly secured to the drive shaft 60. Rotor 65 includes an inside recess 66 to accommodate an inside arcuate shaped magnet 67, and an outside recess 68 to accommodate an outside arcuate shaped magnet 69. Rotor 65 is enclosed by and rotates within a distributor housing 71 as shown in FIG. 2. Distributor housing 71 includes a base portion 73 which is rotatably mounted on the exterior of bearing 62. A cap portion 83 is suitable secured to base 73 by means of fasteners 85. Both base 73 and cap 83 can, thus, rotate together with respect to bearing 62 and frame 25. A shaft 75 rigidly extends from the base portion 73 and carries a timer bracket 77 at its end. Bracket 77 includes an arcuate slot 79. An adjustment bolt 81 is received within the arcuate slot 79 and can be tightened to secure bracket 77 to the frame 25 or loosened to adjust the position of the bracket 77 with respect to the frame 25. Note that as the timer bracket 77 is adjusted with respect to the bolt 81, the base portion 73 and cap 83 of the distributor housing 71 rotates along with the bracket 77 due to shaft 75. Thus, the distributor housing 71 is rotatably adjustable with respect to frame 25.

Base portion 73 houses an upper pair of magnetically activated leaf switches 90, 91 and a lower pair of magnetically activated leaf switches 94, 95. Likewise, cap portion 83 houses an upper pair of magnetically activated leaf switches 100, 101 and a lower pair of magnetically activated leaf switches 104, 105. Note that switches 90, 91, 94, 95, 100, 101, 104 and 105 are normally open and that the presence of magnet 67 adjacent switches 90, 91, or 94, 95, causes such pair of switches to close. Likewise, the presence of magnet 69 adjacent switches 100, 101, or 104, 105, causes the affected pair to close. Consequently, as the magnets 67, 69 rotate with respect to the stationary switches 90 and 91, 94 and 95, 100 and 101, and 104 and 105, these switches are opened and closed by the magnets. By rotatably adjusting the position of housing 71 with respect to frame 25, the position of the switches 90, 91, 94, 95, 100, 101, 104 and 105 can be adjusted with respect to the magnets 67, 69 to serve a purpose later described.

Having disclosed the basic structure of the electromagnetic motor 1 and distributor 70, their operative electrical circuitry will now be described.

Figure 5:
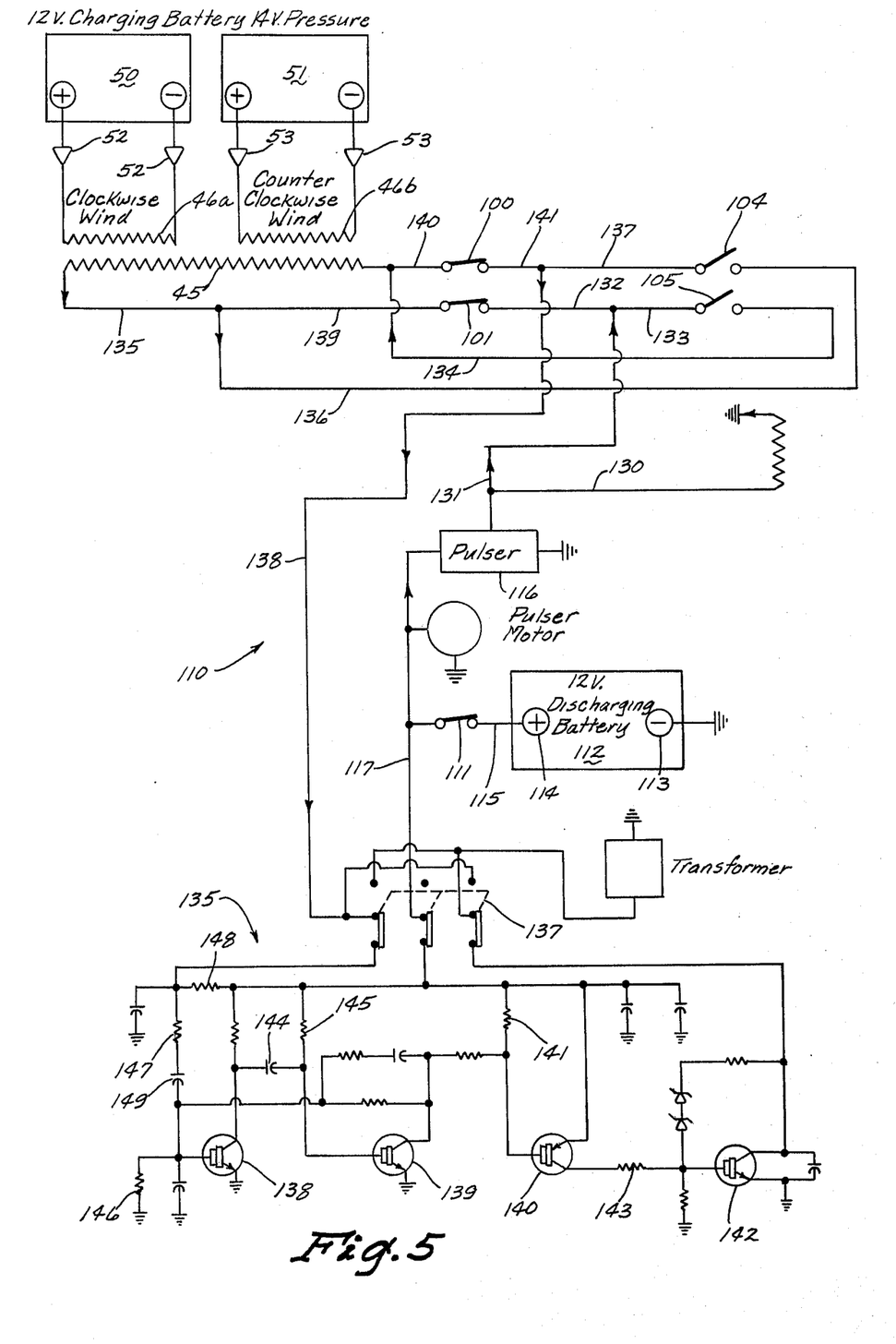
FIG. 5 is a circuit diagram of a portion of the circuitry of the present invention.

FIG. 5 shows the electrical circuitry 110 of the present invention. The circuitry 110 is powered by a battery 112 which has its negative terminal 113 grounded. The positive terminal 114 is connected by a conductor 115 to an on/off switch 111 which is, in turn, connected by conductor 117 to the pulser 116.

Figure 6:
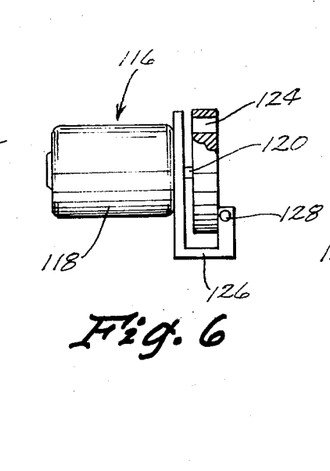
FIGS. 6 & 7 show the pulser of the present invention in partial cross-section.
Figure 7:
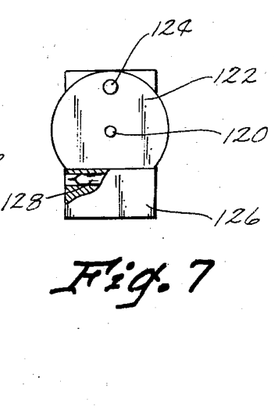

Pulser 116 as best shown in FIGS. 6 and 7 is comprised of a pulser motor 118 (having a suitable power source), having an output shaft 120 with a rotor 122 rigidly secured thereto. Rotor 122 has a magnetic inset 124. A bracket 126 is rigidly secured to the pulser 116. Bracket 126 supports a magnetically activated leaf switch 128 which is closed by the presence of magnet 124 adjacent thereto. Thus, as the motor 118 spins the rotor 122, the magnetic inset 124 opens and closes switch 128. Switch 128 is electrically connected intermediate the battery 110 and coils 10, 30 and 40. The pulser 116, thus, comprises an open circuit between battery 112 and the remainder of the circuit 110 except when the switch 128 is closed by magnet 124.

Pulser 116 has a high pulse rate. It is believed that a pulse rate on the order of 5,000 per second would be optimal. Note that in order to increase the pulse rate of the disclosed pulser 116, the number of magnetic inserts 124 and/or leaf switches 128 could be increased.

Pulser 116 is directly connected to piston coil 12 by a conductor 130. Pulser 116, thus, provides continuous undirectional stream of current pulses to the piston coil 12. The use of the pulser reduces the duty cycle of piston coil 12 and field coils 35, 45.

The pulser 116 is not, however, connected directly to the field coil 30 or 40, but rather is connected to coils 30 and 40 through the switches 90, 91, 94, 95, 100, 101, 104 and 105 of the distributor 70. These switches 90, 91, 94, 95, 100, 101, 104 and 105 distribute current to the field coils 30 and 40 as follows:

With reference to FIG. 5, the connection of pulser 116, through switches 100, 101, 104 and 105 to the primary coil 45 of field coil 40 is shown. The connection of pulser 116 to primary coil 35 of field coil 30 is not shown in order to avoid unnecessary duplication in description. As will become apparent, however, current is distributed to coil 35 in the same manner as will now be described with regard to coil 45, except that coils 35 and 45 are always maintained at opposite polarities.

Pulser 116 is connected by means of conductors 131 and 132 to switch 101 and by means of conductors 131 and 133 to switch 105. Switch 105, which is closed in FIG. 5, is, in turn, connected by conductor 134 to the primary coil 45 of field coil 40. Coil 45 is connected at its other end to conductor 135, which is, in turn, connected to conductor 136. Conductor 136 goes to switch 104, which is also closed in FIG. 5, and conductor 137 leads from the other side of switch 104 to conductor 138.

It can, thus, be appreciated that when distributor switches 104, 105 are closed by magnet 69 of the rotor 65, current flows from battery 112, through pulser 116, and conductor 131 and 133 to switch 105; then through switch 105 and conductor 134 to primary coil 45 of field coil 40. Current goes through coil 45 from right to left in FIG. 5 and leaves through conductors 135 and 136 to switch 104, and through switch 104 to conductor 107 and thence to conductor 138.

Conversely, when magnet 69 of the distributor 70 is rotated away from switches 104 and 105 to a position adjacent switches 100 and 101, switches 100 and 101 close and switches 104 and 105 open. Referring to FIG. 5, if one views switches 100 and 101 as closed, and switches 104 and 105 as open, current flows from the battery 112 through the high frequency pulser 116 to switch 101 via conductors 131, 132. Current then passes from the switch 101 to coil 45 via conductors 139, 135. Current flows from left to right in FIG. 5 through coil 45, and leaves coil 45 via conductor 140 to switch 100. Current then goes through switch 100 and conductor 141 to conductor 138.

It can therefore be appreciated that when the magnet 69 of rotor 65 is in a position adjacent switches 104, 105, switches 104, 105 are closed, and the current goes through primary coil 45 from right to left. As the magnet 69, however rotates away from switches 104, 105 to a position adjacent switches 100, 101, switches 100, 101 close and switches 104, 105 open, causing the current to flow through primary coil 45 from left to right or in the reverse direction in FIG. 5. Hence, as rotor 65 of distributor 70 rotates, the magnet 69 rotates to alternatively open and close the switches 100, 101 and 104, 105, and correspondingly, reverse the direction of current through coil 45. By reversing the direction of current through the coil 45 of field coil 40, the polarity of field coil 40 is, of course, also reversed. Note that the polarity piston coil 12 remains constant at all times.

The other field coil 30 is oppositely arrranged for polarity reversal. As the inner magnet 67 of distributor 70 rotates from one pair of the leaf switches 90, 91 to the other pair 94, 95, these switch pairs are alternatively opened end closed and the polarity through field coil 30 is accordingly reversed in the same manner as described above with the qualification that current always flows through coils 30 and 40 in opposite directions as will now be described.

As shown in FIG. 4, inner magnet 67 and outer magnet 69 are arcuate in shape and each extend approximately 160° about rotor 65. It can, accordingly, be appreciated that in the preferred embodiment, with rotor 65 in rotation, the magnets 67, 69 close their respective switch pairs 90 and 91, 94 and 95, 100 and 101, and 104 and 105 for approximately 160° of rotation and leave them open for the remaining 200° of rotation.

FIG. 1 shows the invention with the piston coil 10 midway between the field coils 30 and 40. This position is shown schematically in FIG. 8a, with the piston coil 10 moving to the left. A full cycle of travel of piston coil 10 is shown in FIGS. 8a-8e. Note that the polarity of the coil 10 remains constant throughout.

Figure 8A:
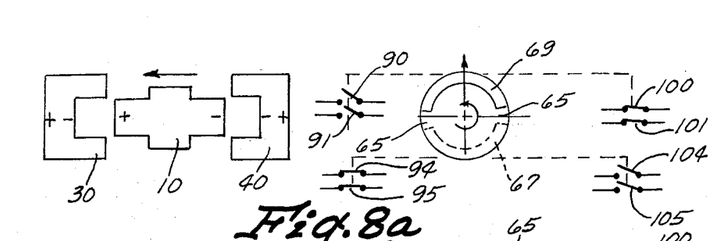
FIGS. 8a–8e are schematic diagrams showing the piston and field coils, and the position of the distributor rotor and switches, through one cycle of the piston.
Figure 8B:
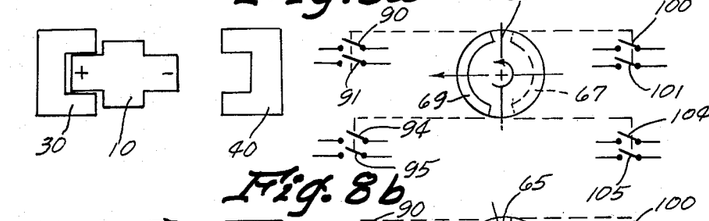
Figure 8C:
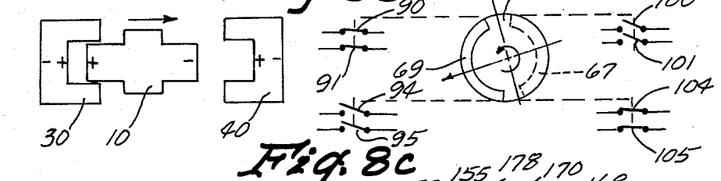
Figure 8D:
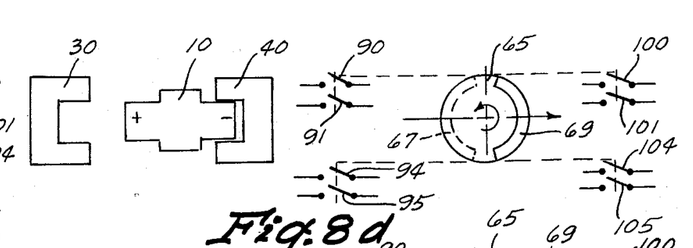
Figure 8E:
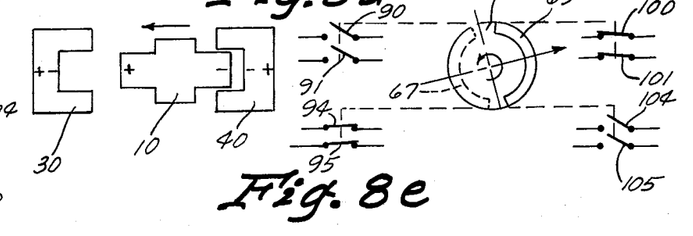

With the piston coil 10 at its midpoint and moving to the left as shown in FIG. 8a, the rotor 65 is at its corresponding "top center" position wherein the magnet 69 is in its "top center" position and magnet 67 is in its "bottom center" position as shown. Note that the position of magnet 69 is used to denote the position of rotor 65 and that magnet 67 is always 180° out of phase with magnet 69.

In this "top center" position, magnet 69 has closed switches 100, 101 and magnet 67 has closed switches 94, 95 as indicated. Switches 90, 91 and 104, 105 are open. With switches 100, 101 and 94, 95 closed, current is flowing through field coil 45 from left to right in FIG. 5, and in field coil 35 in the opposite direction or from right to left. Note that both of the field coils 35, 45, and the piston coil 10 as well, are wound in the same direction. Thus, by causing current to flow from left to right, or clockwise, in primary coil 45, and from right to left, or counterclockwise, in primary coil 35, opposite polarities are achieved in the field coils 30, 40. These opposing polarities corresponding to the "top center" position of rotor 65 are indicated in FIG. 8a. Due to the polarities indicated in FIG. 8a, piston coil 10 is repelled by field coil 40 and attracted by field coil 30. These attraction/repulsion forces, as set up by the inventive design of the present invention, both push and pull the piston coil 10 to the left in FIG. 8a. These polarities remain the same until the piston 10 reaches the "end of stroke left" position of FIG. 8b. In this position, rotor 65 has rotated to the "left center" position shown in FIG. 8b wherein all of the switches 90, 91, 94, 95, 100, 101, and 104, 105 are open, and field coils 30, 40 are, as a result, neutral in polarity. Piston coil 10 is "coasting" in this position. Piston 10 then starts back to the right in FIG. 8b, either under its own momentum or the force of the crankshaft in a multipiston arrangement. Once the piston 10 reaches 10° beyond the "end of stroke left" position, magnets 67, 69 have correspondingly rotated to 10° past the "left center" position of rotor 65 to close switches 90, 91 and 104, 105, respectively. See FIG. 8c. With switches 90, 91 and 104, 105 closed, and 94, 95 and 100, 101 open, the polarities of the field coils 30, 40 are reversed as shown and piston 10 is now forced to the right due to repulsion forces by field coil 30 and attraction forces by field coil 40. Piston 10 continues to the right, with the polarities of coils 30 and 40 constant, through the 160° travel of arcuate magnets 67, 69. Once piston 10 reaches the "end of stroke right" position shown in FIG. 8d, rotor 65 has rotated to its "right center" position wherein all of the switches 90, 91, 94, 95, 100, 101, 104 and 105 are again open and the field coils 30, 40 are neutral. Piston 10 is coasting and starts back to the left. When piston 10 reaches 10° beyond the "end of stroke right" position, shown in FIG. 8e, rotor magnets 67, 69 close switches 94, 95 and 100, 101, respectively, to reverse the polarity of field coils 30, 40 and both push and pull the piston 10 to the left as described above with respect to FIG. 8a. This completes the description of one full two stroke cycle and demonstrates the highly inventive attraction/repulsion feature of the present invention. Where more than one piston is used, of course, each piston would be timed to "fire" at a different point of crankshaft rotation, in order that all pistons would assist each other in driving the crankshaft, as would be obvious to one skilled in the art in light of the above teachings.

Note that the 160° arc of magnets 67, 69 was selected on an estimate of the time required to open and close the switches for reversing polarity. If the four switches 90, 91, 94 and 95 or 100, 101, 104 and 105 are closed simultaneously, a direct short would result. There are two problems to solve in this distributor—magnetic lag at higher RPM and the time required for the mechanical functioning of the magnetic leaf switches. There is an optimum arc but this must be determined by experimentation. Too small an arc would reduce power output, too large an arc could cause shorting. It may well be that the arc could be increased to 170° or 175° or it may be necessary to reduce the arc to 150° or 155°. At present, however, the inventors have found that a 160° arc is suitable.

Referring back to FIG. 1, attention is directed to the "mating structure" of the permanent magnet 11 and spools 31, 41. At the "end of stroke right" position shown in FIG. 8d, the cylindrical end portion 15 of piston 10 is enclosed completely within the cylindrical cavity 48 of field coil 40. As the piston coasts back to the left and reaches approximately 10° beyond the "end of stroke right" position indicated in FIG. 8e where the polarities reverse, a significant portion of the cylindrical end portion 15 will still be enclosed by cavity 48. This proximity of these like polarized members generates a very strong repulsion force pushing the piston 10 to the left in FIG. 8e. By the same token as the cylindrical end portion 14 enters cavity 38 of field coil 30, the close proximity of these oppositely polarized members creates a very strong attractive force which grows increasingly stronger up until approximately 10° before "end of stroke left" where field coil 30 is neutralized. Thus, not only does the present invention disclose a highly inventive attraction/repulsion concept for an electromagnetic motor, but the particular mating structure of the coils 10, 30, 40 enhances the simultaneous attraction/repulsion forces generated.

It has been mentioned above that the pulser 116 of the present invention is to be operated at a high speed, optimally on the order of 5,000 pulses per second. It is to be understood that pulser 116 will be operated at, at least, a much higher speed than the operating speed of the motor 1 itself to ensure that high frequency current pulses are always available to the coils 30, 40 whenever the switches 90, 91 and 104, 105, or 94, 95 and 100, 101 are closed.

It was noted above that distributor 70 included an adjustment feature wherein bolt 81 could be loosened and timer bracket 77 rotated along slot 79 to vary the angular orientation of the switches 90, 91, 94, 95, 100, 101, 104 and 105 from the "vertical" position shown in FIG. 3. The purpose of rotating the switches either counterclockwise in FIG. 3 to a position "before" vertical or clockwise in FIG. 3 to a position "after" vertical is to vary the speed of the motor 1 of the present invention.

Given the 160° arc (approximately) configuration of the magnets 67, 69 of the present invention, the field coils 30, 40 are energized or "on" for 160°, then "off" for approximately 20° and then "on" again for approximately 160°, "off" approximately 20°, etc. During the approximate 20° of piston 10 movement when the coils 30, 40 are "off", the piston 10 coasts. With the switches 90, 91, 94, 95, 100, 101, 104 and 105 in the "vertical" position of FIG. 3, the piston 10 begins to coast at approximately 10° before "end of stroke" (left or right) and continues to coast until approximately 10° after "end of stroke" (left or right). By adjustably rotating the switches to a position either "before" or "after" vertical, the 20° coasting range of piston 10 can be varied. For example, if the distributor 70 is rotatably adjusted counterclockwise in FIG. 3 to a position 10° before vertical, piston 10 would not begin to coast until it hit "end of stroke" (left or right) where the field coils 30, 40 would again be energized. As another example, if the distributor were rotatably adjusted clockwise in FIG. 3 to a position 5° after vertical, piston 10 would begin to coast 15° before "end of stroke" (left or right) and would continue coasting until 5° after "end of stroke" (left or right). Hence, by adjusting the position of the switches 90, 91, 94, 95, 100, 101, 104 and 105 with respect to the vertical, the approximately 20° coasting range of piston 10 can be adjusted to vary the speed of the motor 1.

Having described the basic structure and operation of the present invention, other import aspects will now be described.

It has been noted above that field coils 30, 40 include secondary coils 36, 46 as well as primary coils 35, 45. The purpose of secondary coils 36, 46 is to recover energy lost when the magnetic fields of the primary coils 35, 45 collapse. With reference to FIG. 5 it can be seen that the secondary coil 46 of field coil 40 is comprised of a clockwise wind 46a and a counterclockwise wind 46b. Note that secondary coil 36 has an identical structure and circuitry, but that only secondary coil 46 is shown in FIG. 5 and described to prevent undue length in description. Clockwise wind 46a is connected through diodes 52 to a charging battery 50. Counterclockwise wind 46b is similarily connected through diodes 53 to a charging battery 51. The diodes 52, 53 permit their respective batteries 50, 51 to be charged only. The diodes 52, 53 prevent the secondary coils 46a, 46b from being energized by their respective batteries 50, 51 since such energization could oppose the energization of the primary coil 45 and deplete the batteries 50, 51. The diodes 52, 53 accordingly, only permit current to flow into the batteries 50, 51 to charge the batteries 50, 51. As the current is rapidly pulsed through the primary coil 45, the magnetic field reaches a maximum strength at each pulse and then a minimum strength between pulses. This pulsed expansion and contraction of the magnetic field about primary coil 45 induces a current into the clockwise nd counterclockwise winds 46a, 46b. This current is, in turn, used to charge the batteries 50, 51. When the direction of current through the coil 45 is reversed, the reverse direction pulsed current also causes a pulsed expansion and contraction of the magnetic field about coil 45 which induces a current into the winds 46a, 46b which current is used to charge the batteries 50, 51.

The secondary coil structures 36, 46 and associated circuitry, thus, serve as a current, or energy, recovery system for the motor, improving its efficiency. The use of the pulser 116 is believed to greatly increase the amount of recoverable energy via secondary coils 36, 46. Obviously, batteries charged through this current recovery system can subsequently be employed to power the motor in the place of battery 112, and thereby, improve the efficiency of the present invention.

A further advantageous, although optional, feature of the present invention, is the circuitry 135 shown below the battery 112 in FIG. 5. This circuitry 135 is designed to reduce wear and tear in the switches 90, 91, 94, 95, 100, 101, 104 and 105, and pulser switch 128. The circuitry 135 is optionally switched into the system via three pole double throw switch 137.

Transistors 138 and 139 of circuitry 135 form a monostable multivibrator. In its stable state, transistor 138 is "off", with 12 volts (or supply voltage if other than 12 volts) at its collector, and transistor 139 is "on", with the collector at ground. Transistor 140, a PNP, is "on", because current flows through the collector-emitter junction of transistor 139, resistor 141 and the base-emitter junction of transistor 140. Transistor 142 is "on", because current flows through its base-emitter junction from the collector-emitter current of transistor 140 through resistor 143.

When a pulse (from the points) is applied to the base of transistor 138, it turns "on" and its output immediately goes to ground. Therefore, the positive end of capacitor 144 also goes to ground. Since the voltage or charge across the capacitor cannot instantly go to ground, the negative side of the capacitor 144 goes to 12 volts.

This negative voltage turns off transistor 139 by reverse-biasing it. Transistor 139 will not stay off for a fixed period of time. The collector of transistor 139 is now at battery voltage and the base of transistor 140 is at battery voltage (equal to its emitter voltage) and is turned "off". Base current to transistor 142 stops and transistor 142 turns "off", interrupting the current in the transformer and preventing arcing in the points.

While the switches are closed, resistor 145 is slowly charging the negative end of capacitor 144 in a positive direction. Current is flowing through resistor 146 keeping transistor 138 "on". Eventually, the negative end of capacitor 144 reaches +0.6 volts and turns transistor 139 "on". This removes the voltage from the base of transistor 138 and it turns "off". At this time transistors 139, 140 and 142 are all "on".

The pulse that determines when transistor 138 turns "on" comes from the switches. When the switches are closed, the junction of resistors 147 and 148 is at ground. When the switches open, supply voltage appears to resistor 147 through resistor 148. Capacitor 149 differentiates the voltage, forming a positive spike that turns on transistor 138. Resistor 148 allows about ¼ amp of current to flow through the switches when they are closed.

The "on" time of the multivibrator is determined by capacitor 144 and resistor 145 by the formula $T_{on} = 0.8$ RC. This "on" time is relatively independent of supply voltages because when the capacitor 144 charge increases, the available recharge current also increases.

Having described the structure and operation of the instant electromagnetic motor and its operative electrical circuitry, a particularily suitable manner in which the reciprocating motion of the drive shaft may be employed to do useful work is now disclosed.

As has been described above, drive shaft 20 is connected at each end by connecting rod 55 to a split cam 58. The reciprocating motion of the drive shaft 20 rotates split cam 58 about an axis 59 running through crankshaft 60. The rotation of split cam 58 is used to drive a pair of compressor pistons 155 of a hydraulic system 160 now described. Note that only the cam structure at end 27 of drive shaft 20 will be described below. However, it is to be understood that end 26 of the drive shaft 20 has an identical cam/piston structure. Accordingly, piston 10 (or each piston 10 in a multipiston embodiment) drives four hydraulic compressor pistons 155, two at each end of drive shaft 20.

Figure 9:
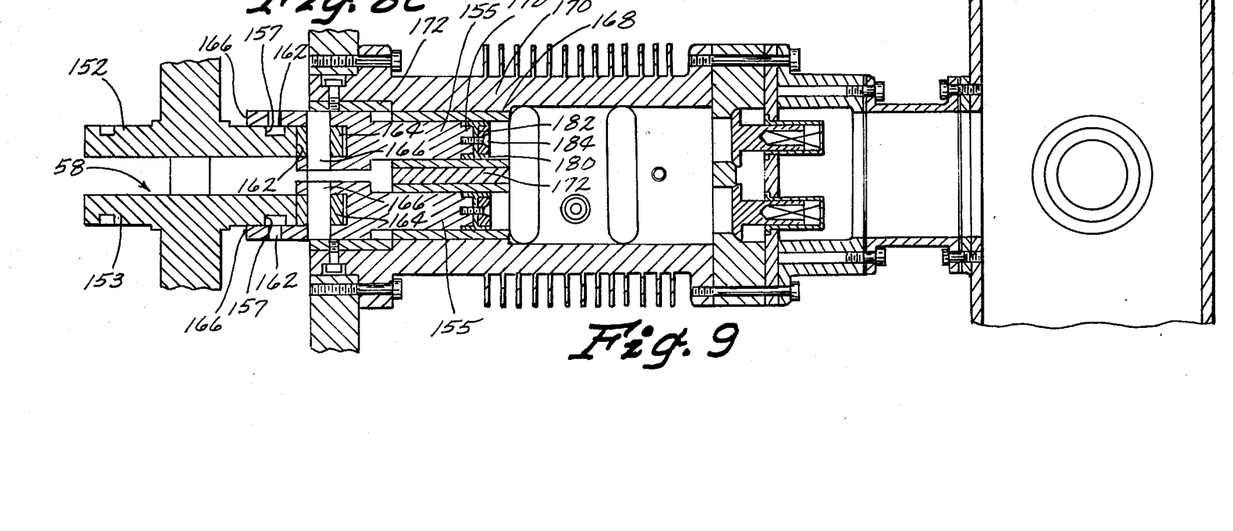
FIG. 9 is a cross-sectional elevational view taken along line 9—9 of FIG. 1 showing the cam activation of the compression piston of the hydraulic system.

Split cam 58, as best shown in FIG. 9, is comprised of an upper cam 152 and a lower cam 153. Both upper cam 152 and lower cam 153 include a follower guide channel 157 on their respective upper and lower surfaces as shown in FIG. 9. Upper and lower cams 152, 153 have cam surfaces 162. Cam surfaces 162 are held in contact with compressor pistons 155 by cam followers 162 and 164. Each piston 155 includes a projecting flange portion 166 which extends across follower guide channel 157. Cam followers 162 are rotatably mounted to the flanges 166 and project into follower guide channels 157. Cam followers 164 are likewise rotatably mounted to pistons 155 by shafts 166.

Pistons 155 are slideably received within cylinders 168 of housing 170. Bearing sleeves 172 are provided between the pistons 155 and cylinders 168 to permit the pistons 155 to move reciprocally within the cylinders 168. It can, thus, be appreciated from the above description taken in conjunction with FIG. 9, that compressor pistons 155 are moved reciprocally as cam 58 rotates due to the arrangement of cam followers 162, 164.

The ends 178 of pistons 155 opposite cam followers 162, 164 are surrounded by seals 180. Seals 180 are secured to the piston 155 by seal retainers 182 secured by screws 184.

In FIG. 1, cam 58 is rotating counterclockwise and is just beginning the compression stroke which extends for 90° of rotation of the cam 58. During the compression stroke cam followers 164 ride along compression camming surfaces 186 of cam 58. As cam followers 164 ride along compression camming surfaces 186, pistons 155 are pushed inwardly by the cam 58. Once the cam 58 has rotated 90° from the position shown in FIG. 1 to the end of stroke point 188 of the camming surfaces 186, the subsequent 90° of rotation of cam 58 comprises an intake stroke during which cam followers 162 pull pistons 155 back out of cylinder 168. The following 180° of rotation of cam 58 produces no change in the position of pistons 155. However, at the end of that 180° of rotation, cam 58 has returned to the position of FIG. 1 to again begin the compression stroke.

Figure 10:
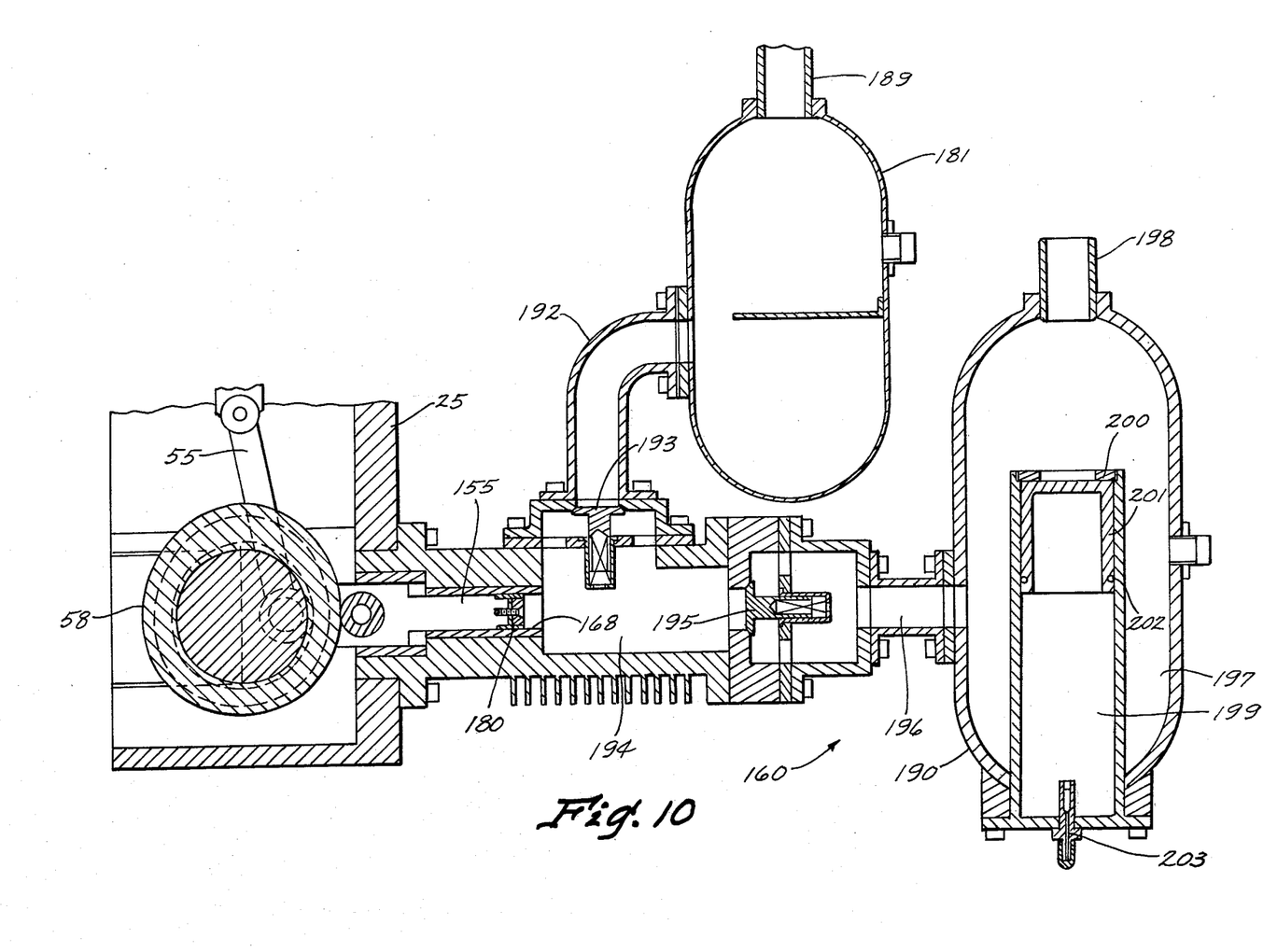
FIG. 10 is a plan view in cross-section of the hydraulic system of the present invention.

The simultaneous reciprocal motion of the pistons 155, in phase, generates fluid pressure which is stored in the accumulator 190 of the hydraulic system 160 as follows:

The hydraulic system 160 of the present invention as shown in FIG. 10 includes a reservoir 191, elbow 192, intake valve 193, compression chamber 194, outlet valve 195, accumulator inlet 196, accumulator tank 197, accumulator outlet 198, compressed air chamber 199, end cap 200, piston 201, seal 202, and ball check valve 203.

The hydraulic system 160 is in fluid communication with a hydraulic transmission in the present embodiment, with hydraulic fluid entering the system 160 through the reservoir inlet 189 and leaving via the accumulator outlet 198. During normal operation the reservoir 191, elbow 192, compression chamber 194, accumulator inlet 196 and accumulator tank 197 are filled with hydraulic fluid under pressure.

The present invention does useful work on this hydraulic fluid to maintain steady operating pressure for the system.

With the system 160 operating normally and full of hydraulic fluid under pressure, the intake stroke, described above, of the compressor pistons 155 generates a pressure differential between the compression chamber 194 (lower pressure) and reservoir 191 (higher pressure) causing higher pressure hydraulic fluid from the elbow 192 to compress the spring of intake valve 193 and flow into the compression chamber 194 until the pressures between the chamber 194 and reservoir 191 are substantially equal. Intake valve 193 closes under the urging of its spring component once the pressure is substantially equal. On the compression stroke, also described above, the pistons 155 are moved against the hydraulic fluid in the compression chamber 194 causing the increase in pressure in the compression chamber. This compression stroke of the pistons 155 causes a pressure differential between the compression chamber 194 (higher pressure) and accumulator 190 (lower pressure) causing outlet valve 195 to open, allowing higher pressure fluid to pass into the accumulator 190. The passing of higher pressure fluid into the accumulator 190 increases the fluid pressure in the accumulator 190. The fluid pressure of the hydraulic fluid in accumulator 190 words against the piston 201 which is compressing trapped air under pressure. The accumulator 190, thus, holds the hydraulic fluid under pressure and supplies it to the transmission as necessary through the outlet 198. Compression piston 155, as powered by the electromagnetic motor driven cam of the present invention can, thus, be used to maintain a steady fluid pressure in a hydraulic transmission system.

The hydraulic application of the electromagnetic motor output is especially suitable in the present invention in that the cam action activating the compression pistons 155 during the compression stroke occurs during the last 90° of movement of the piston 10. (This is apparent from FIG. 1, with the piston 10 viewed as moving to the right and the cam 58, accordingly, rotating counterclockwise.) Hence, the hydraulic compression pistons 155 function to dampen vibrations in the motor 1. Consequently, not only is the instant invention suitable for maintaining stable operating pressure in a hydraulic system, but in addition, the use of the hydraulic system as a part of the invention dampens motor vibrations.

Having hereby disclosed the preferred embodiment of the present invention, it is to be understood that various modifications obvious to one skilled in the art could be made in view of its teachings. The invention, is therefore, intended to be limited only by the scope of the appended claims.

I claim:

1. An electromagnetic motor having a frame and an electrical power source, comprising:
   a first field coil having a first piston coil receiving cavity formed therein, secured to said frame and being electrically connectable to said power source;
   a second field coil having a second piston coil receiving cavity formed therein, secured to said frame and being electrically connectable to said power source;
   a piston coil having end portions for temporary disposition within said first and second cavities of said first and second field coils during operation, said piston coil being adapted to move within said frame between said first and second field coils and being electrically connected to said power source, said power source generating a constant magnetic polarity in said piston coil; and
   distributor means for selectively supplying electric current to said first and second field coils, said distributor means selectively supplying electric current to said first and second field coils to simultaneously generate opposite magnetic polarities in said field coils whereby said piston coil is simultaneously attracted towards one of said field coils and repulsed away from the other of said field coils, said distributor means including means for periodically reversing the polarity of said field coils.

2. The electromagnetic motor of claim 1, wherein said distributor means includes a rotor rotatably driven by said piston coil, said piston coil having a cycle and driving said rotor through one rotation of said rotor during one cycle of travel of said piston coil, said distributor including a plurality of switches intermediate said field coils and said power source, said rotor including means for opening and closing said switches in response to the rotation of said rotor.

3. The electromagnetic motor of claim 2, wherein said distributor includes a distributor housing enclosing said rotor, said rotor being rotatably mounted within said housing, said switches comprising normally open magnetically activated leaf switches secured to said distributor housing proximate said rotor, said rotor including one or more magnetic portions, said leaf switches being magnetically closed by said magnetic portions whenever said magnetic portions of said rotor are adjacent said leaf switches, whereby said leaf switches are opened and closed by said magnetic portion as said rotor is rotated through one revolution.

4. The electromagnetic motor of claim 3, wherein said rotor has an inner magnetic portion and outer magnetic portion, and wherein said leaf switches comprise a first upper pair of leaf switches closeable by said inner magnetic portion and a first lower pair of leaf switches also closeable by said inner magnetic portion, and a second upper pair of leaf switches closeable by said outer magnetic portion and a second lower pair of leaf switches also closeable by said outer magnetic portion.

5. The electromagnetic motor of claim 4, wherein said first upper pair of leaf switches and said first lower pair of leaf switches are secured to said distributor housing at 180° intervals, and wherein said second upper pair of leaf switches and said second lower pair of leaf switches are secured to said distributor housing at 180° intervals.

6. The electromagnetic motor of claim 5, wherein said inner magnetic portion and said outer magnetic portions comprise arcuate magnetic inserts disposed on opposite sides of said rotor at a 180° interval.

7. The electromagnetic motor of claim 6, wherein the rotation of said rotor through one full 360° rotation caused by the travel of said piston through one full cycle, causes said simultaneous closing of said first upper pair of switches by said inner magnetic inset and said second lower pair of switches by said outer magnetic inset for a first portion of the rotation of said rotor less than 180°, and also causes the simultaneous closing of said first lower pair of switches by said inner magnetic insert and said second upper pair of switches by said outer magnetic insert for a second portion of the rotation of said rotor less than 180°.

8. The electromagnetic motor of claim 7, wherein the closure of said first upper pair of switches causes current to flow through said first field coil in a first direction, and the closure of said first lower pair of switches causes current to flow through said first field coil in a second direction opposite to said first direction, and wherein the closure of said second upper pair of switches causes current to flow through said second field coil in said first direction and the closure of said second lower pair of switches causes current to flow through said field coil in said second direction opposite to said first direction.

9. The electromagnetic motor of claim 2, wherein a shaft rigidly extends from said piston coil and a connecting rod is pivotally secured at one end to said drive shaft and rotatably secured at the other end to a crankshaft, said rotor being rigidly secured to said crankshaft to rotate with said crankshaft.

10. The electromagnetic motor of claim 9, further comprising a cam rigidly secured to said crankshaft to rotate with said crankshaft and a compression piston slideably received within a compression cylinder of a hydraulic system, said compression cylinder containing hydraulic fluid, said compression piston being moved reciprocally with respect to said compression cylinder by the rotation of said cam, said compression piston having a compression stroke and an intake stroke, said compression piston being forced by said cam into said compression cylinder against said hydraulic fluid to increase the pressure of said hydraulic fluid during said compression stroke, said compression piston being retracted from said compression cylinder by said cam during said intake stroke.

11. The electromagnetic motor of claim 3, wherein said distributor housing is rotatably mounted to said frame and includes a means for rigidly, but releasably, securing said distributor housing with respect to said frame whereby said distributor housing is rotatably adjustable with respect to said frame.

12. The electromagnetic motor of claim 1, wherein said piston coil has a two stroke cycle, an end of stroke left position adjacent to said first field coil with one said end portion being at least partially disposed within said first cavity provided therefor, and an end of stroke right position adjacent said second field coil with another said end portion being at least partially disposed within said second cavity provided therefor, said cycle being defined by the movement of said piston coil from said end of stroke left position to said end of stroke right position and then back to said end of stroke left position, said distributor means reversing the polarity of said first and second field coils when said piston coil is in, or near to, said end of stroke right or said end of stroke left position.

13. The electromagnetic motor of claim 1, wherein said field coils include primary coils in electrical connection with said power supply and secondary coils in electrical connection with one or more charging batteries and a means for preventing said charging batteries from discharging through said secondary coils, said secondary coils being would adjacent said primary coils, whereby the change of current flow in said primary coils induces a recovery current flow in said secondary coils which charges said charging batteries.

14. The electromagnetic motor of claim 13, wherein each of said primary coils is wound adjacent a clockwise wind secondary coil and a counterclockwise wind secondary coil.

15. The electromagnetic motor of claim 14, further comprising a pulser in electrical connection intermediate said power source and said primary coils of said field coils, said pulser transforming a substantially steady current flow from said power source to a high frequency pulsed current flow and delivering said pulsed current flow to said primary coils.

16. The electromagnetic motor of claim 15, wherein said pulser comprises a motor connected to a power source and having a rotationally driven output drive shaft, a pulser rotor being rigidly secured to said drive shaft and having a magnetic inset portion, a frame being secured to said pulser motor, and a magnetically activated switch being secured to said frame proximate said rotor, said switch being closeable by said magnetic inset of said rotor, whereby the rotation of said rotor causes said switch to open and close, said switch being electrically connected intermediate said power source and said primary coils.

17. The electromagnetic motor of claim 1, wherein said piston coil comprises a coil wound about a member having two ends and a first end portion projecting from one of said ends and a second end portion projecting from the other of said ends, said first field coil having a first cavity suitably formed to receivably enclose said first end portion, said second field coil having a second cavity suitably formed to receivably enclose said second end portion, said piston coil having an end of stroke left and an end of stroke right position, said first end portion being receivably enclosed by said first cavity when said piston coil is in said end of stroke left position, said second end portion being receivably enclosed by said second cavity when said piston coil is in said end of stroke right position.

18. The electromagnetic motor of claim 17, wherein said distributor means reverses the polarity of said field coils when said piston coil is at, or near, said end of stroke left or said end of stroke right position.

* * * * *